(12) United States Patent
Xu et al.

(10) Patent No.: US 12,502,993 B2
(45) Date of Patent: Dec. 23, 2025

(54) GUN-RETURNING DETECTION METHOD AND APPARATUS, CHARGING PILE, AND CHARGING PILE MANAGEMENT SYSTEM

(71) Applicant: Autel Digital Power Co., Ltd., Shenzhen (CN)

(72) Inventors: Yunfeng Xu, Shenzhen (CN); Yaqiao Wang, Shenzhen (CN)

(73) Assignee: AUTEL DIGITAL POWER CO., LTD., Shenzhen (CN)

( * ) Notice: Subject to any disclaimer, the term of this patent is extended or adjusted under 35 U.S.C. 154(b) by 0 days.

(21) Appl. No.: 18/704,062

(22) PCT Filed: Sep. 14, 2022

(86) PCT No.: PCT/CN2022/118644
§ 371 (c)(1),
(2) Date: Apr. 24, 2024

(87) PCT Pub. No.: WO2023/071575
PCT Pub. Date: May 4, 2023

(65) Prior Publication Data
US 2024/0383360 A1 Nov. 21, 2024

(30) Foreign Application Priority Data
Oct. 26, 2021 (CN) .......................... 202111249718.0

(51) Int. Cl.
*B60L 53/60* (2019.01)
*B60L 53/16* (2019.01)
(Continued)

(52) U.S. Cl.
CPC ............... *B60L 53/60* (2019.02); *B60L 53/16* (2019.02); *B60L 53/31* (2019.02); *G06K 7/10366* (2013.01)

(58) Field of Classification Search
CPC .......... B60L 53/60; B60L 53/31; B06L 53/16; G06K 7/1036; G06K 7/00
(Continued)

(56) References Cited

U.S. PATENT DOCUMENTS

2014/0292261 A1 10/2014 Wang
2020/0398692 A1* 12/2020 Zu ..................... G06Q 20/3278
(Continued)

FOREIGN PATENT DOCUMENTS

CN 106781047 A * 5/2017
CN 206226069 U 6/2017
(Continued)

OTHER PUBLICATIONS

International Search Report of PCT Patent Application No. PCT/CN2022/118644 issued on Jan. 3, 2023.
(Continued)

*Primary Examiner* — Edwyn Labaze (57) ABSTRACT

A gun-returning detection method is applied to a charging pile, the charging pile comprises a charging gun and a slot for accommodating the charging gun, the charging gun is provided with an electronic tag, and the slot is provided with a radio frequency identification module. The method firstly acquires tag information about the charging gun inserted into the slot, and then judges whether the tag information matches with the verification information about the slot, so as to obtain and output a final gun-returning detection result; the gun-returning detection method provided in the present application can realize one-to-one identification of a charging gun and a slot, and detect whether the charging gun is homed to the original slot which is beneficial to the management of the charging gun and the charging pile.

15 Claims, 5 Drawing Sheets

(51) Int. Cl.
  *B60L 53/31* (2019.01)
  *G06K 7/10* (2006.01)
(58) Field of Classification Search
  USPC .............................. 235/451, 439, 435, 375
  See application file for complete search history.

(56) References Cited

U.S. PATENT DOCUMENTS

| | | | |
|---|---|---|---|
| 2021/0273460 | A1 | 9/2021 | Yan |
| 2022/0169134 | A1* | 6/2022 | Xu .................... G06Q 10/06 |

FOREIGN PATENT DOCUMENTS

| | | | | | |
|---|---|---|---|---|---|
| CN | 107097674 | A | | 8/2017 | |
| CN | 206465797 | U | * | 9/2017 | |
| CN | 107554322 | A | | 1/2018 | |
| CN | 207260703 | U | | 4/2018 | |
| CN | 108521055 | A | | 9/2018 | |
| CN | 109927570 | A | | 6/2019 | |
| CN | 110027438 | A | | 7/2019 | |
| CN | 110040017 | A | * | 7/2019 | ............ B60L 3/0015 |
| CN | 209426589 | U | | 9/2019 | |
| CN | 110588428 | A | * | 12/2019 | ............. B60L 53/31 |
| CN | 210804625 | U | | 6/2020 | |
| CN | 113147464 | A | | 7/2021 | |
| CN | 113147913 | A | | 7/2021 | |
| CN | 113370810 | A | | 9/2021 | |
| CN | 114043895 | A | | 2/2022 | |
| DE | 102011080456 | A1 | | 2/2013 | |
| WO | 2017211270 | A1 | | 12/2017 | |

OTHER PUBLICATIONS

The first office action of CN patent application No. 202111249718.0 issued on Jun. 5, 2023.
The search report of CN patent application No. 202111249718.0 issued on Jun. 5, 2023.
The second office action of CN patent application No. 202111249718.0 issued on Jan. 17, 2024.
The search report of CN patent application No. 202111249718.0 issued on Jan. 17, 2024.

* cited by examiner

GUN-RETURNING DETECTION METHOD AND APPARATUS, CHARGING PILE, AND CHARGING PILE MANAGEMENT SYSTEM

CROSS-REFERENCE TO RELATED APPLICATIONS

The application is the National Stage application for PCT patent application Serial No. PCT/CN2022/118644, filed on Sep. 14, 2022, which claims priority to the Chinese patent application No. 202111249718.0 entitled "Gun-Returning Detection Method and Apparatus, Charging Pile, and Charging Pile Management System" filed on Oct. 26, 2021, to the China National Intellectual Property Administration, the entire contents of which are incorporated herein by reference.

TECHNICAL FIELD

The embodiments of the present invention relate to the field of charging pile technology, and more particularly to a gun-returning detection method and apparatus, a charging pile, and a charging pile management system.

BACKGROUND OF THE INVENTION

With the increase in sales and occupation of new energy automobiles in the market, the demand for new energy automobiles to be charged by users is also increasing. In various public places, such as community garages, corporate parking lots, etc., there are charging piles that can charge the new energy automobiles. When the users use the charging piles to charge, a charging gun is pulled out from the charging pile and inserted into a charging base of a new energy automobile to charge the new energy automobile. After the charging is completed, the user returns the charging gun.

In the process of the user returning the charging gun, there are two main schemes for the traditional charging pile gun-returning detection:
- scheme 1: implementing gun-returning detection by providing an infrared or ultrasonic transceiving integrated module on the charging pile, the module automatically emitting infrared light, and then judging whether a charging gun is inserted into the charging pile to perform a gun returning operation according to a reflection signal (if there is a reflection signal); and
- scheme 2: implementing gun-returning detection by providing a mechanical switch on the charging pile, and judging whether a charging gun is inserted into the charging pile to perform a gun returning operation according to whether a mechanical switch is closed.

In implementing the embodiments of the present invention, the inventors have found that the above related art has at least the following problems: in either scheme 1 or scheme 2, it is impossible to identify that the slot is blocked by an obstacle or that a charging gun not in this slot is mis-inserted, and it is impossible to effectively manage the charging gun.

SUMMARY OF THE INVENTION

Embodiments of the present application provide a highly reliable gun-returning detection method and apparatus, charging pile, and charging pile management system.

The object of the embodiments of the present invention is achieved by the following technical scheme.

In order to solve the above technical problem, in the first aspect, an embodiment of the present invention provides a gun-returning detection method for a charging gun applied to a charging pile, wherein the charging pile comprises a charging gun and a slot for accommodating the charging gun, an electronic tag is provided on the charging gun, and a radio frequency identification module is provided on the slot, the method comprising:
- acquiring tag information about a charging gun inserted into the slot; and
- judging whether the tag information matches with verification information about the slot so as to obtain and output a gun-returning detection result.

In some embodiments, judging whether the tag information matches with verification information about the slot so as to obtain and output a gun-returning detection result comprises:
- when it is judged that an obtained result is that the tag information matches with the verification information about the slot, outputting a detection result that gun-returning is successful;
- and when it is judged that the obtained result is that the tag information does not match with the verification information about the slot, outputting a detection result that gun-returning is unsuccessful.

In some embodiments, the method further comprises:
- judging whether the verification information is acquired within a preset time range; and
- if not, outputting the detection result that the gun has not been returned.

In some embodiments, the charging pile comprises at least two slots, and when a detection result of gun returning failure is output, the method further comprises:
- acquiring verification information about all the slots;
- according to verification information about all the slots, matching slots matched with the tag information so as to obtain a matching result of the slots which should be used for inserting into the charging gun;
- and outputting a detection result that does not correspond to gun returning and the matching result.

In some embodiments, two electronic tags are provided on two sides of a gun head of the charging gun, and the judging whether the tag information matches with verification information about the slot so as to obtain and output a gun-returning detection result comprises:
- when tag information about two electronic tags is detected, outputting a detection result that gun-returning is successful;
- when tag information about one electronic tag is detected, outputting a detection result that gun-returning is not in place;
- and when no tag information is detected, outputting a detection result that the gun has not been returned.

In order to solve the above technical problem, in the second aspect, an embodiment of the present invention provides a gun-returning detection apparatus for a charging gun applied to a charging pile, wherein the charging pile comprises a charging gun and a slot for accommodating the charging gun, an electronic tag is provided on the charging gun, and a radio frequency identification module is provided on the slot, the apparatus comprising:
- a first acquisition module connected to the radio frequency identification module and configured to acquire tag information about a charging gun inserted into the slot via the radio frequency identification module;

a second acquisition module connected to the slot and configured to acquire verification information about the slot into which the charging gun is inserted;

a judgement module, which is respectively connected to the first acquisition module and the second acquisition module, and is configured to judge whether the tag information matches with the verification information about the slot;

and an output module connected to the judgement module and configured to output a gun-returning detection result.

In some embodiments, the judgement module is configured such that when it is judged that an obtained result is that the tag information matches with the verification information about the slot, the output module is configured to output a detection result that gun-returning is successful;

the judgement module is configured such that when it is judged that the obtained result is that the tag information does not match with the verification information about the slot, the output module is configured to output a detection result that gun-returning is unsuccessful.

In some embodiments, the output module is further connected to the second acquisition module, and the output module is further configured such that the second acquisition module outputs a detection result that the gun has not been returned when no verification information is acquired within a preset time range.

In some embodiments, when the charging pile comprises at least two slots, the apparatus further comprises:

a matching module, which is respectively connected to the second acquisition module and the output module, and is configured to acquire verification information about all slots and match slots matched with the tag information when the detection result is that gun-returning is unsuccessful, so as to obtain a matching result of the slots which should be used for inserting the charging gun, wherein the output module is further configured to output a detection result that does not correspond to gun returning at the same time as outputting the detection result that gun-returning is unsuccessful, and to output the matching result.

In some embodiments, two electronic tags are provided on two sides of a gun head of the charging gun.

The output module is further configured such that the first acquisition module outputs a detection result that gun-returning is successful when tag information about two electronic tags is detected, outputs a detection result that gun-returning is not in place when the tag information about one electronic tag is detected, and outputs a detection result that the gun has not been returned when no tag information is detected.

In some embodiments, the apparatus further comprises:
a display module connected to the output module and configured to display the detection result and the matching result.

In some embodiments, the apparatus further comprises:
a voice module connected to the output module and configured to convert the detection result and the matching result into voice and then play the same.

In order to solve the above technical problem, according to the third aspect, an embodiment of the present invention provides a charging pile, comprising:
a charging gun provided with an electronic tag storing verification information;

a slot for accommodating the charging gun, wherein the slot is provided with a radio frequency identification module for identifying the electronic tag;

a controller comprising: at least one processor, and,
a memory communicatively connected to at least one processor, wherein
the memory stores an instruction executable by at least one processor, the instruction being executed by at least one processor to enable at least one processor to execute the method according to the first aspect.

In some embodiments, two electronic tags are provided on two sides of a gun head of the charging gun.

In some embodiments, the number of slots is at least two.

In order to solve the above technical problem, in the fourth aspect, an embodiment of the present invention provides a charging pile management system, comprising:
the charging pile according to the third aspect described above, and
a mobile terminal and/or a server communicatively connected to the charging pile to acquire detection data of the charging pile.

Compared with the prior art, the advantageous effects of the present invention are as follows: unlike the prior art, in an embodiment of the present invention, a gun-returning detection method, an apparatus, a charging pile, and a charging pile management system are provided; the gun-returning detection method is applied to a charging pile, the charging pile comprises a charging gun and a slot for accommodating the charging gun, an electronic tag is provided on the charging gun, and a radio frequency identification module is provided on the slot; the method firstly acquires tag information about the charging gun inserted into the slot, and then judges whether the tag information matches verification information about the slot so as to obtain and output a final gun-returning detection result; the gun-returning detection method provided in the present application can realize one-to-one identification of a charging gun and a slot, and detect whether the charging gun is homed to the original slot, making it beneficial to the management of the charging gun and the charging pile.

BRIEF DESCRIPTION OF DRAWINGS

One or more embodiments are exemplified by drawings in the accompanying drawings corresponding to the embodiments. These exemplified descriptions do not constitute a limitation on the embodiments. Elements/modules in the drawings having the same reference number designations are illustrated as similar elements/modules, and unless otherwise particularly stated, the drawings do not constitute a proportional limitation.

DETAILED DESCRIPTION OF THE INVENTION

Hereinafter, the present invention will be described in detail with reference to specific embodiments. The following embodiments will aid those skilled in the art in further understanding the present invention, but do not limit the invention in any way. It should be noted that several variations and modifications can be further made by a person of ordinary skills in the art without departing from the concept of the invention. These are all within the scope of the present invention.

In order to make the object, technical schemes, and advantages of the present application more apparent, a more particular description of the present application will be rendered below with reference to the accompanying drawings and embodiments. It should be understood that the specific embodiments described herein are merely illustrative of the present application and are not intended to be limiting thereof.

It needs to be noted that, if not in conflict, the various features of the embodiments of the invention may be combined with each other and fall within the scope of the present application. In addition, although a functional module division is performed in a schematic diagram of an apparatus, in some cases, it can be divided into modules different from those in the apparatus. Furthermore, the terms "first", "second", and the like, as used herein, do not limit the data and the execution order, but rather distinguish between the same or similar items that perform substantially the same function or have substantially the same effect. It needs to be noted that when one element is referred to as being "connected" to another element, it can be directly connected to the other element or one or more intervening elements may be present therebetween.

Unless defined otherwise, all technical and scientific terms used in the specification have the same meaning as commonly understood by one of ordinary skill in the art to which the present invention belongs. In the description, the terminology used in the description of the present invention is for the purpose of describing specific implementation modes only and is not intended to limit the present invention. As used herein, the term "and/or" includes any and all combinations of one or more of the associated listed items.

Furthermore, the technical features involved in each implementation mode of the present invention described below can be combined with each other as long as they do not conflict with each other.

Figure 1:
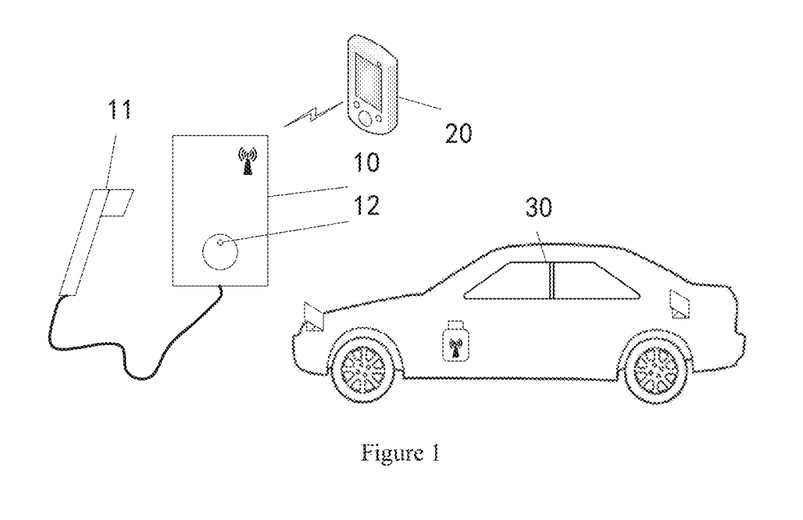
FIG. 1 is a schematic view showing one of the application environments of a gun-returning detection method for a charging gun provided by an embodiment of the present invention.

In order to solve the problem that the current charging gun cannot be accurately homed, an embodiment of the present invention provides a gun-returning detection method and apparatus, a charging pile, and a charging pile management system. FIG. 1 is a schematic view of one of the application environments of the gun-returning detection apparatus provided by an embodiment of the present invention. The application environment includes therein: a charging pile 10, a mobile terminal 20, and a new energy automobile 30.

The charging pile 10 comprises a charging gun 11 and a slot 12 for accommodating the charging gun 11; the charging pile 10 is an electric energy conversion apparatus for charging a new energy automobile 30, and is a main component for controlling a charging process; an input end of the charging pile 10 is connected to the mains supply, and the mains supply is adjusted to a voltage and current usable by the new energy automobile 30 and then output via the charging gun 11; the charging pile 10 comprises both a direct current charging pile and an alternating current charging pile.

It needs to be noted that the gun-returning detection apparatus 100 for a charging gun provided in the embodiment of the present invention is provided in the charging pile 10, is in communication connection with the slot 12 on the charging pile 10, acquires the data of the slot 12 and the charging gun 11 inserted into the slot 12, and performs calculation and analysis so as to obtain a final gun-returning detection result; therefore, the gun-returning detection apparatus 100 can be a controller with calculation capability and data storage capability and integrated with each module of the gun-returning detection apparatus provided in an embodiment of the present invention; for example, the scenario that it may be a micro-control unit (MCU), and the controller can also be provided with a processor for processing data and a memory for storing data, so as to realize the function of gun-returning detection.

The mobile terminal 20 is an apparatus that is in communication connection with the charging pile 10, can view data information uploaded by the charging pile 10, issues a control instruction or data to the charging pile 10, and realizes data interaction with the charging tube 10; the mobile terminal 20 can be an upper computer such as a mobile phone, a notebook computer, a tablet computing device, or a diagnostic instrument; the connecting mode between the mobile terminal 20 and the charging pile 10 can be wired, such as realizing the connection by means of a port, a data line, etc. or wireless, such as realizing the connection by means of WiFi, Bluetooth, a local area network, etc. Specifically, the product categories and connecting modes of the mobile terminal 20 can be set according to actual scenarios. In some embodiments, the mobile terminal 20 may also be replaced with a server or a cloud server to enable unified management of multiple charging piles 10.

The new energy automobile 30 is an automobile using electric energy as a main power source or one of the power sources, and can acquire electric energy mainly through the charging pile 10 as described above and convert part of the electric energy into kinetic energy or the mechanical energy that enables the new energy automobile 30 to travel normally on a road surface.

Specifically, an embodiment of the present invention will be further described with reference to the following drawings.

Embodiment 1

Figure 2:
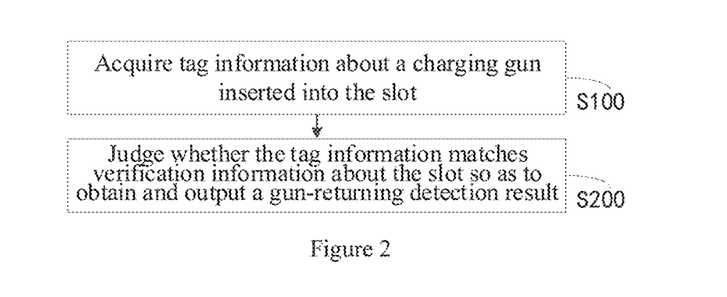
FIG. 2 is a schematic flow chart of a gun-returning detection method for a charging gun provided by embodiment 1 of the present invention.

An embodiment of the present invention provides a gun-returning detection method for a charging gun. The gun-returning detection method for a charging gun is applied to a charging pile, the charging pile can be a charging pile 10 as shown in the above-mentioned application scenario and FIG. 1, the charging pile comprises a charging gun and a slot for accommodating the charging gun, the charging gun is provided thereon with an electronic tag, and a radio frequency identification module is provided on the slot. With reference to FIG. 2, the flow of a gun-returning detection method for a charging gun provided by an embodiment of the present invention is shown, and the gun-returning detection method for a charging gun comprises but is not limited to the following steps:

step S100: acquiring tag information about a charging gun inserted into the slot;

In an embodiment of the present invention, tag information about a charging gun inserted into the slot can be firstly acquired via a radio frequency identification module; specifically, when a charging gun is inserted into the slot, the slot can scan an electronic tag on the charging gun inserted into the slot via the radio frequency identification module so as to acquire the tag information about the electronic tag.

Step S200: judge whether the tag information matches verification information about the slot so as to obtain and output a gun-returning detection result.

Figure 3:
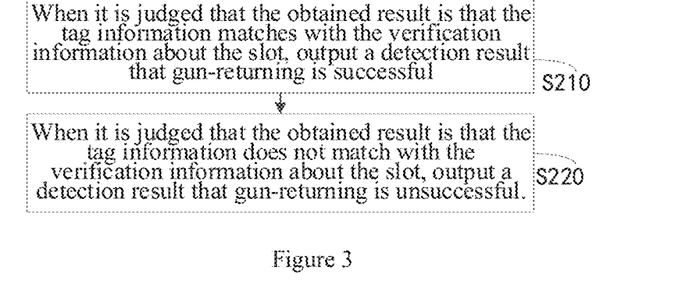
FIG. 3 is a schematic view of a subflow of step S200 in the gun-returning detection method shown in FIG. 2.

In an embodiment of the present invention, after the tag information of the charging gun inserted into the slot is acquired, the verification information of the slot is acquired, and then it can be determined whether there is a match by comparing the relationship table/mapping table of the verification information of the slot and the tag information, thereby determining whether the gun is returned successfully. Specifically, referring to FIG. 3, a subflow of step S200 in the gun-returning detection method shown in FIG. 2 is shown. The judging whether the tag information matches verification information about the slot so as to obtain and output a gun-returning detection result comprises:

step S210: when it is judged that the obtained result is that the tag information matches with the verification information about the slot, outputting a detection result that gun-returning is successful; and step S220: when it is judged that the obtained result is that the tag information does not match with the verification information about the slot, outputting a detection result that gun-returning is unsuccessful.

In an embodiment of the present invention, each slot corresponds to a charging gun binding. Therefore, verification information about each slot has tag information about a charging gun matching the same, and whether a charging gun needing to be returned is inserted into a corresponding slot is determined by matching the verification information with the tag information.

Figure 4:
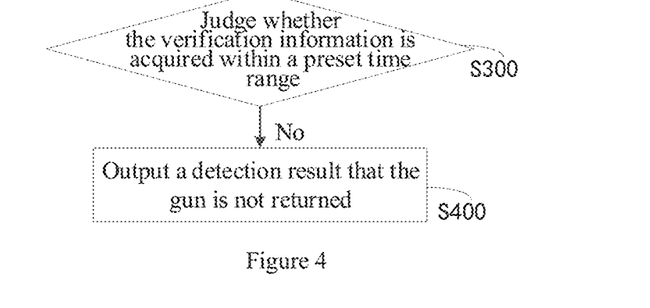
FIG. 4 is a schematic flow chart of a gun-returning detection method for another charging gun provided by embodiment 1 of the present invention.

In some embodiments, reference is made to FIG. 4, which illustrates a flow of another gun-returning detection method for a charging gun provided by an embodiment of the invention. The method further comprises:

step S300: judging whether the verification information is acquired within a preset time range; and if not, jumping to step S400; and step S400: outputting the detection result that the gun is not returned.

In an embodiment of the present invention, the return time may also be set. When the user does not return the charging gun within a preset time range, a detection result that the gun is not returned is output so as to avoid a situation where the user forgets to return it. The preset time range may be set according to charging requirements, for example, after performing a calculation according to the electric quantity of a new energy automobile, the time required for charging the new energy automobile being three hours is obtained, and then three hours plus ten minutes (a grace time) is set as the preset time range. If the charging pile does not return the charging gun after it is detected that the charging gun has been pulled out for three hours and ten minutes, a detection result that the gun is not returned is output.

Figure 5:
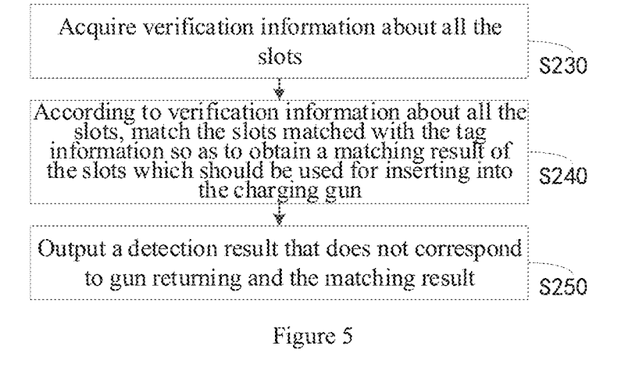
FIG. 5 is a schematic view of another subflow of step S200 in the gun-returning detection method shown in FIG. 2.

In some embodiments, the charging pile comprises at least two slots. See FIG. 5, which shows another subflow of step S200 in the gun-returning detection method shown in FIG. 2. When outputting a detection result that the gun-returning is unsuccessful, the method further comprises:

step S230: acquiring verification information about all the slots;

step S240: according to verification information about all the slots, matching the slots matched with the tag information so as to obtain a matching result of the slots which should be used for inserting into the charging gun; and step S250: outputting a detection result that does not correspond to gun returning and the matching result.

In an embodiment of the present invention, further, there may be a case where the user returns the gun but inserts the charging gun into the wrong slot. At this time, the verification information and the tag information do not match. Further, verification information about each slot is acquired, and the verification information of each slot that matches/binds/has a mapping relationship with the tag information is searched according to the tag information, thereby confirming that the slot into which the charging gun used by the current user should be inserted is obtained.

Figure 6:
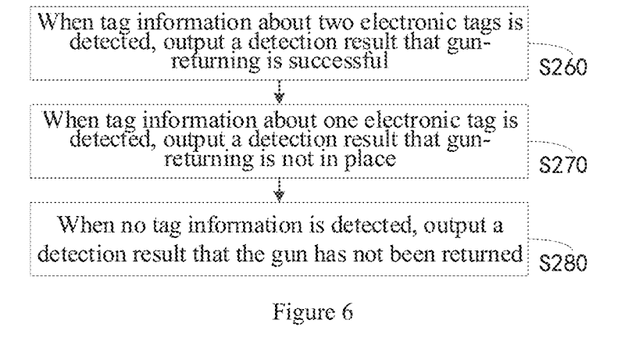
FIG. 6 is a schematic view of another subflow of step S200 in the gun-returning detection method shown in FIG. 2.

In some embodiments, two electronic tags are provided on two sides of the gun head of the charging gun. Please refer to FIG. 6, which shows a schematic flow diagram of another subflow of step S200 in the gun-returning detection method shown in FIG. 2. The judging whether the tag information matches verification information about the slot so as to obtain and output a gun-returning detection result comprises:

step S260: when tag information about two electronic tags is detected, outputting a detection result that gun-returning is successful;

step S270: when tag information about one electronic tag is detected, outputting a detection result that gun-returning is not in place; and step S280: when no tag information is detected, outputting a detection result that the gun has not been returned.

In an embodiment of the present invention, in order to avoid the situation that the user does not return the charging gun in place, for example, the situation where the charging gun is inserted into the slot obliquely such that the charging gun may be loosened and dropped, it is also necessary to provide an electronic tag on each side of the gun head of the charging gun. It is only possible to confirm that the charging gun is inserted in place after the tag information about the two electronic tags is acquired at the same time.

Embodiment 2

Figure 7:
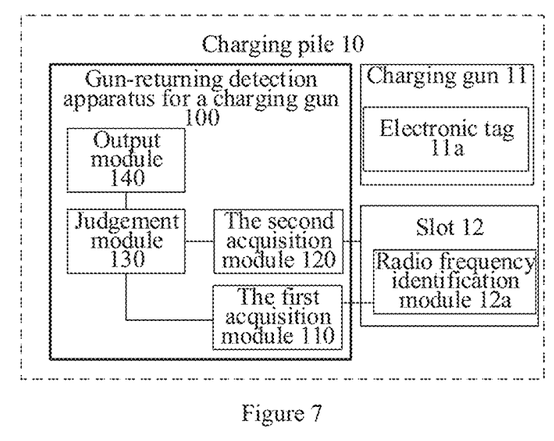
FIG. 7 is a schematic view showing a structure of a gun-returning detection apparatus of a charging gun provided by embodiment 2 of the present invention.

An embodiment of the present invention provides a gun-returning detection apparatus for a charging gun. Referring to FIG. 7, there is shown a structure of a gun-returning detection apparatus for a charging gun according to an embodiment of the present invention. The gun-returning detection apparatus 100 for a charging gun is applied to a charging pile 10. The charging pile 10 comprises a charging gun 11 and a slot 12 for accommodating the charging gun 11.

The charging gun 11 is provided with an electronic tag 11a and the slot 12 is provided with a radio frequency identification module (Radio Frequency IDentification, RFID) 12a. The gun-returning detection 100 of the charging gun of the apparatus comprises a first acquisition module 110, a second acquisition module 120, a judgement module 130, and an output module 140.

The first acquisition module 110 is connected to the radio frequency identification module 12a and configured to acquire tag information about a charging gun 11 inserted into the slot 12 via the radio frequency identification module 12a; specifically, when a charging gun 11 is inserted into a slot 12, the slot 12 can scan an electronic tag 11a on the charging gun 11 inserted into the slot 12 via the radio frequency identification module 12a so as to acquire tag information about the electronic tag 11a, and the first acquisition module 110 is connected with the radio frequency identification module 12a to acquire tag information about the electronic tag 11a. The tag information can be number information, etc. about the electronic tag 11a.

The second acquisition module 120 is connected to the slot 12 and configured to acquire verification information about the slot 12 into which the charging gun 11 is inserted; specifically, when the charging gun 11 is inserted into the slot 12, the verification information of the slot 12 also needs to be acquired by the second acquisition module 120. The verification information can be the number of the slot 12, and/or the number information about the charging gun 11 of the charging gun 11 bound by the slot 12, etc.

The judgement module 130 is respectively connected to the first acquisition module 110 and the second acquisition module 120, and is configured to judge whether the tag information matches the verification information about the slot 12; after acquiring the verification information and the tag information, the judging module 130 may determine whether there is a match through a relationship table/mapping table of the verification information and the tag information stored in it.

The output module 140 is connected to the judgement module 130 and is configured to output a gun-returning detection result. Finally, the output module 140 outputs a gun-returning detection result according to the matching result. Specifically, the judgement module 130 is configured such that when judging that the obtained result is that the tag information matches the verification information about the slot 12, the output module 140 is configured to output a detection result that gun-returning is successful; the judgement module 130 is configured such that when judging that the obtained result is that the tag information does not match the verification information about the slot 12, the output module 140 is configured to output a detection result that gun-returning is unsuccessful.

Figure 8:
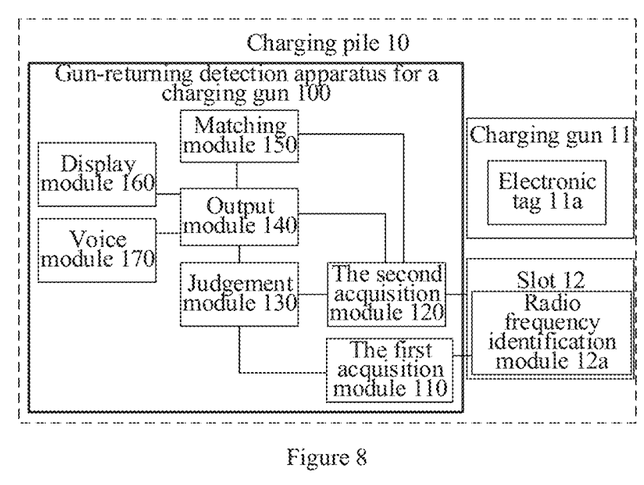
FIG. 8 is a schematic view showing a structure of a gun-returning detection apparatus of another charging gun provided by embodiment 2 of the present invention.

In some embodiments, referring to FIG. 8, there is shown a structure of a gun-returning detection apparatus of another charging gun provided by an embodiment of the present invention. The output module 140 is further connected to the second acquisition module 120, and the output module 140 is further configured such that the second acquisition module 120 outputs a detection result that the gun has not been returned when verification information is not acquired within a preset time range. In an embodiment of the present invention, further, the return time may also be set. When the user does not return the charging gun 11 within a preset time range, a detection result that the gun has not been returned is output. The preset time range may be calculated since the charging gun 11 is picked up by the user, or may be calculated after the charging gun 11 fully charges the new energy automobile 30. Specifically, the time length and calculation start mode may be set according to actual needs.

In some embodiments, with continued reference to FIG. 8, when the charging pile 10 includes at least two slots 12, the gun-returning detection apparatus 100 further includes: a matching module 150 respectively connected to the second acquisition module 120 and the output module 140 and configured to acquire verification information about all the slots 12 and match the slots 12 matched with the tag information when the detection result is a gun returning failure, so as to obtain a matching result which should be used for inserting the slot 12 of the charging gun 11, wherein the output module 140 is further configured to output a detection result which does not correspond to gun returning at the same time as outputting the detection result of gun returning failure, and output the matching result. In an embodiment of the present invention, when it is detected that the verification information and the tag information do not match, it indicates that the user may insert the charging gun 11 into a wrong slot 12, and at this time, it is further possible to acquire the verification information about each slot 12 via the matching module 150, and search for the verification information of each slot 12 that matches/binds/has a mapping relationship with the tag information according to the tag information, thereby confirming that the slot 12 into which the charging gun used by the current user should be inserted is obtained.

In some embodiments, with continued reference to FIG. 8, two electronic tags 11a are provided on two sides of the gun head of the charging gun 11. The output module 140 is further configured to output a detection result that the gun is returned successfully when the first acquisition module 110 detects the tag information about two electronic tags 11a, output a detection result of not returning a gun into place when the tag information about one electronic tag 11a is detected, and output a detection result of not returning a gun when the tag information is not detected. In an embodiment of the present invention, further, since the user may not insert the charging gun 11 in place due to operation error when inserting the charging gun 11 back into the slot 12, At this time, the charging gun 11 is likely to fall out of the slot 12. Therefore, the electronic tag 11a can also be set on two sides of the gun head of the charging gun 11. After the first acquisition module 110 acquires the tag information of two electronic tags 11a at the same time, it can be confirmed that the charging gun 11 is inserted in place.

In some embodiments, with continued reference to FIG. 8, the gun-returning detection apparatus 100 further comprises a display module 160 connected to the output module 140 and configured to display the detection result and the matching result. Furthermore, after a gun-returning detection result is obtained, the detection result can also be displayed via a display module 160 so as to enable a user to know the current gun-returning state, whether the gun-returning is successful, whether the gun-returning is in place, etc.; specifically, the display module 160 can be an electronic display screen for displaying the detection result by means of words and/or graphs, and specifically can be set according to actual needs, without being bound by limitations of the embodiments of the present invention.

In some embodiments, with continued reference to FIG. 8, the gun-returning detection apparatus 100 further comprises a voice module 170 connected to the output module 140 and configured to convert the detection result and the matching result into voice and then play the same. Furthermore, in order to draw more attention from the user and make the user know the detection result more visually, a voice module 170 may also be provided to prompt the user of the current gun-returning state by means of voice broadcasting; furthermore, the detection result can also be prompted by different colors in combination with light emitting diode LED and other lamps. Specifically, it can be set according to actual needs, without being bound by the limitations of the embodiments of the present invention.

Embodiment 3

Figure 9:
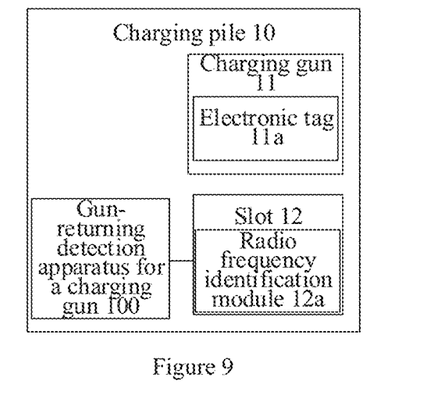
FIG. 9 is a schematic view showing a structure of a charging pile provided by embodiment 3 of the present invention.

An embodiment of the present invention provides a charging pile. Referring to FIG. 9, a structure of a charging pile according to an embodiment of the present invention is shown. The charging pile 10 comprises a charging gun 11 provided with an electronic tag 11a storing verification information; a slot 12, for accommodating the charging gun 11, being provided with a radio frequency identification module 12a for identifying the electronic tag 11a; and the gun-returning detection apparatus 100 for a charging gun according to embodiment 2.

In the charging pile 10 provided in the embodiment of the present invention, it is possible to further detect whether the charging gun 11 is returned, whether the charging gun 11 is returned in place, a slot 12 where the charging gun should be returned, etc. by means of the gun-returning detection apparatus 100 of a charging gun according to embodiment 2 described above. Specifically, please refer to embodiment 2 for the structure, function, etc. of the gun-returning detection apparatus 100, which will not be described in detail herein.

In some embodiments, two electronic tags 11a are provided on two sides of the gun head of the charging gun 11. Further, when the charging gun 11 is inserted into the correct slot 12, in order to detect whether the charging gun 11 is accurately and completely inserted into the corresponding slot 12, it is also possible to provide an electronic tag 11a on two sides of the gun head of the charging gun 11, and determine that the charging gun is returned in place when both electronic tags 11a are detected.

In some embodiments, the number of slots 12 is at least two. Further, multiple slots 12 may be provided on the same charging pile 10, and the same number of charging guns 11 may be matched on multiple slots 12 to provide the ability to power multiple new energy automobiles during the same time period.

Embodiment 4

Figure 10:
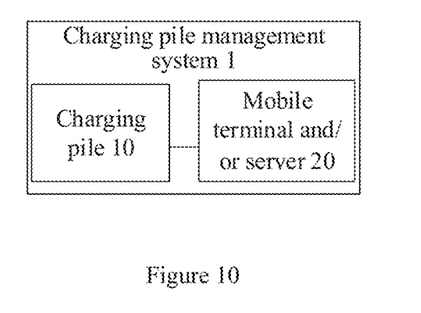
FIG. 10 is a schematic view showing a structure of a charging pile management system provided by embodiment 4 of the present invention.

An embodiment of the present invention provides a charging pile management system. Referring to FIG. 10, there is shown a structure of a charging pile management system according to an embodiment of the present invention. The charging pile management system 1 comprises the charging pile 10 according to embodiment 3 described above, and a mobile terminal and/or a server 20 communicatively connected to the charging pile 10 to acquire detection data of the charging pile 10.

In an embodiment of the present invention, further, in order to enable a user to understand the current charging situation and a gun-returning situation when the user returns a gun more visually and timely, a wireless communication apparatus may also be provided in the charging pile 10 to realize a connection with a mobile terminal 20. The above-mentioned charging situation and gun-returning situation are pushed by an application program in the mobile terminal 20. The mobile terminal may be the mobile terminal 20 in the above-mentioned application scenario and as shown in FIG. 1, and specifically may be set according to actual needs.

In an embodiment of the present invention, further, in order to achieve effective management of multiple charging piles 10, the charging piles 10 can also achieve a connection with a server 20 via a wireless communication apparatus, and the server 20 can be a service device such as a monitoring system of the parking area and can also be a cloud server, and specifically can be set according to actual needs.

In an embodiment of the present invention, a gun-returning detection method, an apparatus, a charging pile, and a charging pile management system are provided. The gun-returning detection method is applied to a charging pile, the charging pile comprises a charging gun and a slot for accommodating the charging gun, an electronic tag is provided on the charging gun, and a radio frequency identification module is provided on the slot; the method firstly acquires tag information about the charging gun inserted into the slot, and then judges whether the tag information matches verification information about the slot so as to obtain and output a final gun-returning detection result. The gun-returning detection method provided in the present application can realize one-to-one identification of a charging gun and a slot, and detect whether the charging gun is homed to the original slot, making it beneficial to the management of the charging gun and the charging pile.

It needs to be noted that the above-described apparatus embodiments are merely illustrative. The units described as separate components may or may not be physically separated, and the components displayed as units may or may not be physical units, that is, they may be located in one place, or they may be distributed on multiple network units. Some or all of the modules can be selected according to actual needs to achieve the purpose of the scheme of the embodiment.

Finally, it should be noted that: the above embodiments are merely illustrative of the technical schemes of the present invention, rather than limiting it; combinations of technical features in the above embodiments or in different embodiments are also possible under the idea of the present invention, and the steps can be implemented in any order; there are many other variations of the different aspects of the present invention as described above, which are not provided in detail for the sake of brevity; although the present invention has been described in detail with reference to the foregoing embodiments, those of ordinary skills in the art will appreciate that the technical schemes disclosed in the above-mentioned embodiments can still be modified, or some of the technical features thereof can be replaced by equivalents; such modifications or replacements do not depart the essence of the corresponding technical scheme from the scope of the technical schemes of embodiments of the present invention.

The invention claimed is:

1. A gun-returning detection method for a charging gun, being applied to a charging pile, wherein the charging pile comprises a charging gun and a slot for accommodating the charging gun, at least one electronic tag is provided on the charging gun, and a radio frequency identification module is provided on the slot, the method comprising:
    acquiring tag information about a charging gun inserted into the slot; and
    judging whether the tag information matches with verification information about the slot so as to obtain and output a gun-returning detection result.

2. The gun-returning detection method according to claim 1, wherein the judging whether the tag information matches with verification information about the slot so as to obtain and output a gun-returning detection result comprises:

when it is judged that an obtained result is that the tag information matches with the verification information about the slot, outputting a detection result that gun-returning is successful;

and when it is judged that the obtained result is that the tag information does not match with the verification information about the slot, outputting a detection result that gun-returning is unsuccessful.

3. The gun-returning detection method according to claim 2, further comprising:

judging whether the verification information is acquired within a preset time range; and if not, outputting the detection result that the gun has not been returned.

4. The gun-returning detection method according to claim 2, wherein the charging pile comprises at least two slots, and when a detection result of gun returning failure is output, the method further comprises:

acquiring verification information about all the slots; and according to verification information about all the slots, matching slots matched with the tag information so as to obtain a matching result of the slots which should be used for inserting into the charging gun;

and outputting a detection result that does not correspond to gun returning and the matching result.

5. The gun-returning detection method according to claim 1, wherein two electronic tags are provided on two sides of a gun head of the charging gun respectively, and the judging whether the tag information matches with verification information about the slot so as to obtain and output a gun-returning detection result comprises:

when tag information about the two electronic tags is detected, outputting a detection result that gun-returning is successful;

when tag information about one of the two electronic tags is detected, outputting a detection result that gun-returning is not in place, and when no tag information is detected, outputting a detection result that the gun has not been returned.

6. A charging pile, comprising:

a charging gun provided with at least one electronic tag storing verification information;

at least one slot for accommodating the charging gun, wherein the at least one slot is provided with a radio frequency identification module for identifying the electronic tag;

a controller comprising: at least one processor, and, a memory communicatively connected to the at least one processor, wherein the memory stores an instruction executable by the at least one processor, the instruction being executed by the at least one processor to enable the at least one processor to execute the method according to claim 1.

7. The charging pile according to claim 6, wherein two said electronic tags are provided on two sides of a gun head of the charging gun.

8. The charging pile according to claim 6, wherein the at least one slot has a number equal or greater than two.

9. A charging pile management system, comprising:

the charging pile according to claim 6, and, a mobile terminal and/or a server communicatively connected to the charging pile to acquire detection data of the charging pile.

10. A gun-returning detection apparatus for a charging gun, being applied to a charging pile, wherein the charging pile comprises a charging gun and a slot for accommodating the charging gun, at least one electronic tag is provided on the charging gun, and a radio frequency identification module is provided on the slot, the apparatus comprising:

a first acquisition module connected to the radio frequency identification module and configured to acquire tag information about a charging gun inserted into the slot via the radio frequency identification module;

a second acquisition module connected to the slot and configured to acquire verification information about the slot into which the charging gun is inserted;

a judgement module, which is respectively connected to the first acquisition module and the second acquisition module, and is configured to judge whether the tag information matches with the verification information about the slot;

and an output module connected to the judgement module and configured to output a gun-returning detection result.

11. The gun-returning detection apparatus according to claim 10, wherein the judgement module is configured such that when it is judged that an obtained result is that the tag information matches with the verification information about the slot, the output module is configured to output a detection result that gun-returning is successful;

the judgement module is configured such that when it is judged that the obtained result is that the tag information does not match with the verification information about the slot, the output module is configured to output a detection result that gun-returning is unsuccessful.

12. The gun-returning detection apparatus according to claim 10, wherein the output module is further connected to the second acquisition module, and the output module is further configured such that the second acquisition module outputs a detection result that the gun has not been returned when no verification information is acquired within a preset time range.

13. The gun-returning detection apparatus according to claim 10, wherein when the charging pile comprises at least two slots, the apparatus further comprises:

a matching module, which is respectively connected to the second acquisition module and the output module, and is configured to acquire verification information about all slots and match slots matched with the tag information when the detection result is that gun-returning is unsuccessful, so as to obtain a matching result of the slots which should be used for inserting the charging gun, wherein the output module is further configured to output a detection result that does not correspond to gun returning at the same time as outputting the detection result that gun-returning is unsuccessful, and output the matching result.

14. The gun-returning detection apparatus according to claim 10, wherein two electronic tags are provided on two sides of a gun head of the charging gun;

wherein the output module is further configured such that the first acquisition module outputs a detection result that gun-returning is successful when tag information about two electronic tags is detected, outputs a detection result that gun-returning is not in place when the tag information about one electronic tag is detected, and outputs a detection result that the gun has not been returned when no tag information is detected.

15. The gun-returning detection apparatus according to claim 10, wherein the apparatus further comprises:
a display module connected to the output module and configured to display the detection result and the matching result.

\* \* \* \* \*